(12) United States Patent
Chen et al.

(10) Patent No.: US 11,112,660 B2
(45) Date of Patent: Sep. 7, 2021

(54) ELECTROSTATIC DISCHARGE DEVICE, LIQUID CRYSTAL DISPLAY PANEL AND DISPLAY APPARATUS

(71) Applicant: Xianyang Caihong Optoelectronics Technology Co., Ltd, Xianyang (CN)

(72) Inventors: Yuyeh Chen, Xianyang (CN); Yusheng Huang, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 17/034,300

(22) Filed: Sep. 28, 2020

(65) Prior Publication Data

US 2021/0109411 A1 Apr. 15, 2021

(30) Foreign Application Priority Data

Oct. 15, 2019 (CN) .......................... 201910976198.X

(51) Int. Cl.
*G02F 1/1362* (2006.01)
*G02F 1/1335* (2006.01)

(52) U.S. Cl.
CPC .. *G02F 1/136204* (2013.01); *G02F 1/133514* (2013.01); *G02F 2202/22* (2013.01)

(58) Field of Classification Search
CPC ...................... G02F 1/136204; G02F 2202/22
See application file for complete search history.

(56) References Cited

U.S. PATENT DOCUMENTS

2017/0131603 A1* 5/2017 Xie ................... G02F 1/136204

* cited by examiner

*Primary Examiner* — Jessica M Merlin
(74) *Attorney, Agent, or Firm* — WPAT, PC

(57) ABSTRACT

An electrostatic discharge (ESD) device applied to a liquid crystal display (LCD) panel includes: an electrostatic concentration structure, protruded on a color film substrate of the LCD panel; and an electrostatic discharge structure, being disposed on an array substrate of the LCD panel, positionally corresponding to the electrostatic concentration structure and having an interval relative to the electrostatic concentration structure satisfying a preset interval. Or, the ESD device includes an electrostatic discharge structure disposed on an array substrate of the LCD panel and having an interval relative to a color film substrate of the LCD panel satisfying a preset interval. Therefore, the ESD device can effectively reduce damage caused by static electricity to the LCD panel, and carry out electrostatic protection on the side of color film substrate as well as on the surroundings of the display panel, so that a strong anti-static protection ability is achieved.

11 Claims, 5 Drawing Sheets

ELECTROSTATIC DISCHARGE DEVICE, LIQUID CRYSTAL DISPLAY PANEL AND DISPLAY APPARATUS

TECHNICAL FIELD

The invention relates to the field of display technologies, and more particularly to an electrostatic discharge (ESD) device, a liquid crystal display panel, and a display apparatus.

DESCRIPTION OF RELATED ART

As to a liquid crystal display (LCD) panel from its own production to transportation and a product which uses the liquid crystal display panel from production to transportation, the static electricity is everywhere and cannot be avoided. The display panel is densely covered with a large number of traces, and these traces are prone to static electricity accumulation. It is very important to effectively prevent static electricity from harming the liquid crystal display panel.

At present, a widely adopted method in the industry is to prevent the static electricity in the environment from causing damage to the display panel through process control, such as ion blowing between working procedures to reduce charge accumulation, relevant staff wear anti-static bracelets and wear shoes and clothes that are not prone to static electricity; or add conductive accessories to a product supporting frame of the liquid crystal display panel used on the client to prevent static electricity damage during use. However, the above process control has certain limitations. It can only be controlled in own factory and cannot be continued to the client. Therefore, it is very important to strengthen the electrostatic protection from the design of the display panel itself.

Accordingly, it is necessary to solve one or more problems existing in the above related technical solutions.

It should be noted that this section is intended to provide background or context for embodiments of the invention stated in the claims. The description herein cannot be recognized as prior art just because it is included in this section.

SUMMARY

An objective of embodiments of the invention is to provide an electrostatic discharge device, which can overcome one or more problems caused by the limitations and defects of related technologies at least in a certain extent.

According to a first aspect of embodiments of the invention, an electrostatic discharge device is provided and applied to a liquid crystal display panel. The electrostatic discharge device includes: an electrostatic concentration structure, protruded on a color film substrate of the liquid crystal display panel; and an electrostatic discharge structure, disposed on an array substrate of the liquid crystal display panel and positionally corresponding to the electrostatic concentration structure. An interval between the electrostatic discharge structure and the electrostatic concentration structure satisfies a preset interval.

In an embodiment of the invention, the electrostatic discharge structure is a bidirectional protection diode circuit.

In an embodiment of the invention, the electrostatic discharge structure includes an electrostatic collection sub-structure and an electrostatic discharge sub-structure.

In an embodiment of the invention, the electrostatic collection sub-structure is protruded from the array substrate to form a convex portion, and a surface of the convex portion has a conductive layer. The conductive layer of the electrostatic collection sub-structure is positionally corresponding to the electrostatic concentration structure, and an interval between the conductive layer and the electrostatic concentration structure satisfies the present interval.

In an embodiment of the invention, the electrostatic discharge sub-structure is a thin film transistor disposed near the electrostatic collection sub-structure, a gate electrode and a drain electrode of the thin film transistor are communicated with each other, and the gate electrode is electrically connected to the conductive layer of the electrostatic collection sub-structure.

In an embodiment of the invention, the electrostatic discharge structure is grounded, or serially connected to form an electrostatic vortex discharge ring, or connected to a tip discharge structure, or connected to a preset signal circuit on the array substrate.

According to a second aspect of embodiments of the invention, an electrostatic discharge device is provided and applied to a liquid crystal display panel. The electrostatic discharge device includes: an electrostatic discharge structure, disposed on an array substrate of the liquid crystal display panel. Moreover, an interval between the electrostatic discharge structure and a color film substrate of the liquid crystal display panel satisfies a present interval.

In an embodiment of the invention, the electrostatic discharge structure is a bidirectional protection diode circuit.

In an embodiment of the invention, the electrostatic discharge structure is protruded from the array substrate to form convex portion, and a surface of the convex portion has a conductive layer. Moreover, an interval between the conductive layer and the color film substrate of the liquid crystal display panel satisfies the present interval.

In an embodiment of the invention, the electrostatic discharge structure includes an electrostatic collection sub-structure and an electrostatic discharge sub-structure.

In an embodiment of the invention, the electrostatic collection sub-structure is protruded from the array substrate to form a convex portion, and a surface of the convex portion has a conductive layer. Moreover, an interval between the conductive layer of the electrostatic collection sub-structure and the color film substrate of the liquid crystal display panel satisfies the present interval.

In an embodiment of the invention, the electrostatic discharge sub-structure is a thin film transistor disposed near the electrostatic collection sub-structure, a gate electrode of the thin film transistor and a drain electrode of the thin film transistor are communicated with each other, and the gate electrode is electrically connected to the conductive layer of the electrostatic collection sub-structure.

In an embodiment of the invention, the electrostatic discharge structure is grounded, or serially connected to form an electrostatic vortex discharge ring, or connected to a tip discharge structure, or connected to a preset signal circuit on the array substrate.

According to a third aspect of embodiments of the invention, a liquid crystal display panel is provided. The liquid crystal display panel includes the electrostatic discharge device as described in any one of the embodiments of the invention.

According to a fourth aspect of embodiments of the invention, a display apparatus is provided. The display apparatus includes the liquid crystal display panel as described in above embodiment.

The technical solutions provided by the embodiments of the invention may achieve following beneficial effects that: in the embodiments of the invention, the electrostatic discharge device applied to the liquid crystal display panel can effectively reduce the damage caused by static electricity to the display panel by the electrostatic discharge structure even the electrostatic concentration structure, and further not only can carry out electrostatic protection on the side of color film substrate, but also can carry out electrostatic protection on the surroundings of the display panel, and thereby achieving a strong anti-static protection ability.

BRIEF DESCRIPTION OF THE DRAWINGS

The drawings herein are incorporated into the specification and constitute a part of the specification, show embodiments in accordance with the invention, and together with the specification are used to explain a principle of the invention. Apparently, the drawings described below are merely some embodiments of the disclosure, and those skilled in the art can obtain other drawings based on these drawings without creative efforts.

DETAILED DESCRIPTION OF EMBODIMENTS

Figure 1:
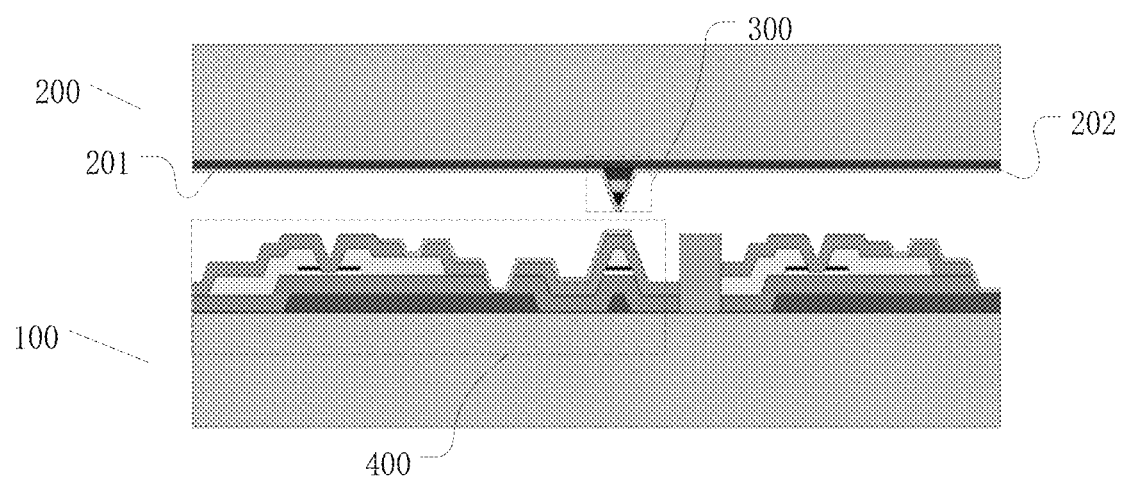
FIG. 1 is a schematic structural view of an electrostatic concentration structure and an electrostatic discharge structure according to an exemplary embodiment of the invention.

In the following, exemplary embodiments are described more fully with reference to the accompanying drawings. However, the exemplary embodiments can be implemented in a variety of forms, and should not be understood to be limited to the examples described herein. On the contrary, the provision of these embodiments makes the invention be more comprehensive and complete, and conveys the conceptions of the exemplary embodiments to those skilled in the art fully. The described features, structures or characteristics can be combined in one or more embodiments in any suitable way.

In addition, the drawings are only schematic illustrations of embodiments of the invention, and are not necessarily drawn to scale. The same reference numerals in the drawings denote the same or similar parts, and thus their repeated description will be omitted. Some of block diagrams shown in the drawings are functional entities, which do not necessarily correspond to physically or logically independent entities.

An exemplary embodiment of the invention firstly provides an electrostatic discharge device applied to a liquid crystal display panel. The electrostatic discharge device includes: an electrostatic concentration structure 300 and an electrostatic discharge structure 400. The electrostatic concentration structure 300 is protruded on a color film substrate 200 of the liquid crystal display panel. The electrostatic discharge structure 400 is disposed on an array substrate 100 of the liquid crystal display panel and positionally corresponding to the electrostatic concentration structure 300. An interval between the electrostatic discharge structure 400 and the electrostatic concentration structure 300 satisfies a present interval.

The electrostatic discharge device applied to the liquid crystal display panel can effectively reduce the damage caused by static electricity to the display panel by the electrostatic concentration structure and the electrostatic discharge structure, and further not only can carry out electrostatic protection on the side of color film substrate, but also can carry out electrostatic protection on the surroundings of the display panel, and therefore achieves strong anti-static protection ability.

In the following, various parts of the above described electrostatic discharge device in the exemplary embodiment will be described in more detail with reference to FIG. 1 through FIG. 3.

In a concrete embodiment, the color film substrate 200 of the liquid crystal display panel may include a first electrode layer 201 and a black matrix layer 202. The electrostatic concentration structure 300 as a structure protruded on the color film substrate 200 may be formed by a material layer disposed between the first electrode layer 201 and the black matrix layer 202. The material layer may include one or more of a red pixel material layer, a green pixel material layer, a blue pixel material layer and a photoresist layer, but of course it is not limited thereto. The electrostatic discharge structure 400 is disposed corresponding to the electrostatic concentration structure 300 and used for collecting static electricity concentrated on the electrostatic concentration structure 300. The interval between the electrostatic discharge structure 400 and the electrostatic concentration structure 300 meets a present interval. The present interval is required to be smaller than a minimum interval between surface conductive layers of the color film substrate 200 and the array substrate 100 when the liquid crystal display panel is without the electrostatic discharge structure 400 and the electrostatic concentration structure 300. For example, when the minimum interval/spacing between the surface conductive layers of the color film substrate 200 and the array substrate 100 is H and the present interval is M, then M<H; within this interval, the electrostatic discharge structure 400 can effectively collect the static electricity concentrated onto the electrostatic concentration structure 300, but of course it is not limited thereto.

The liquid crystal display panel may include a display area 10 and a non-display area 20 surrounding the display area 10. The electrostatic concentration structure 300 and the electrostatic discharge structure 400 may be arranged in the non-display area 20 of the liquid crystal display panel. The non-display area 20 may include multiple electrostatic concentration structures 300 and multiple electrostatic discharge structures 400, the distribution position and distribution quantity of the multiple electrostatic concentration structures 300 and the multiple electrostatic discharge structures 400 can be set according to electrostatic protection capabilities required in respective areas of the liquid crystal display panel. A convex shape of the electrostatic concentration structure 300 may be an elongated strip shape, or a conical shape, but of course it is not limited to this.

Figure 4:
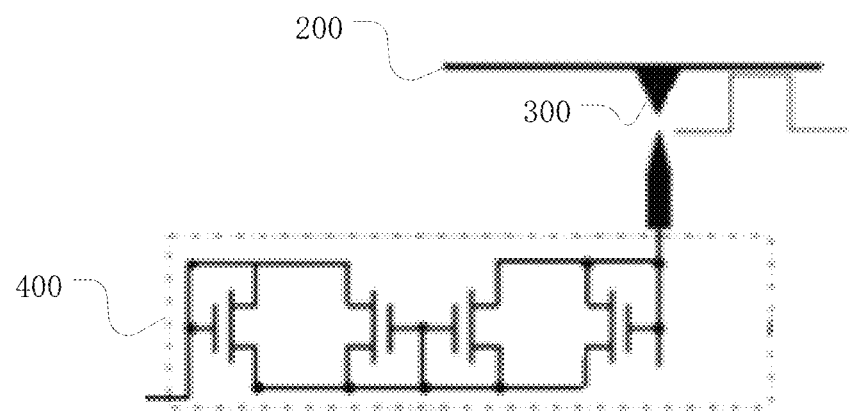
FIG. 4 is a schematic equivalent circuit diagram of the electrostatic concentration structure and the electrostatic discharge structure according to an exemplary embodiment of the invention.

In an embodiment, as shown in FIG. 4, the electrostatic discharge structure 400 may include a bidirectional protection diode circuit. The bidirectional protection diode circuit is disposed positionally corresponding to the electrostatic concentration structure 300, and has an interval with respect to the electrostatic concentration structure 300 meets the present interval. An end of the bidirectional protection diode circuit is used for collecting the static electricity concentrated onto the electrostatic concentration structure 300, and another end of the bidirectional protection diode circuit is used for discharging the collected static electricity.

Figure 2:
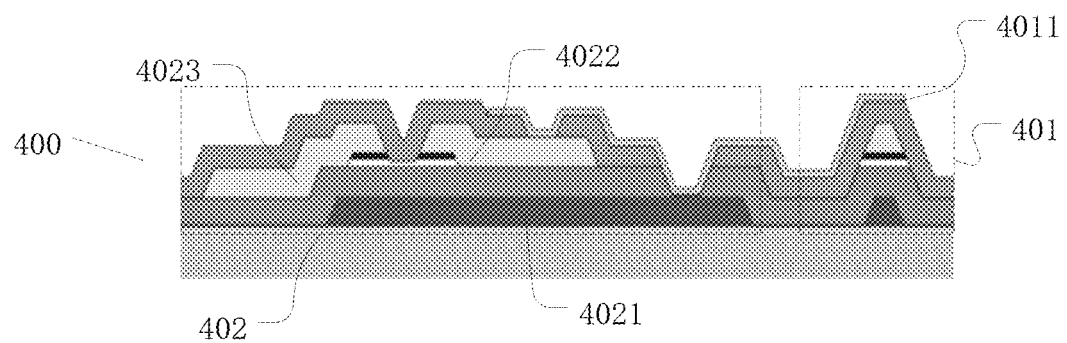
FIG. 2 is a schematic structural view of the electrostatic discharge structure according to an exemplary embodiment of the invention.
Figure 3:
FIG. 3 is a schematic view of a display area and a non-display area of a liquid crystal display panel according to an exemplary embodiment of the invention.
Figure 5:
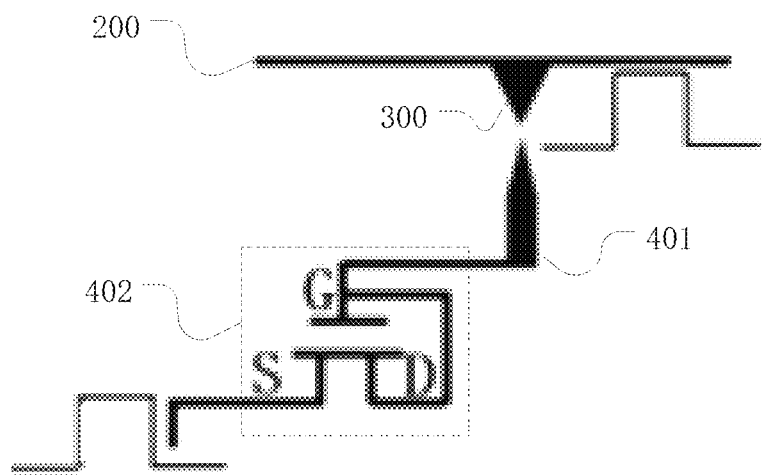
FIG. 5 is a schematic equivalent circuit diagram of the electrostatic concentration structure and the electrostatic discharge structure according to another exemplary embodiment of the invention.

In an embodiment, as shown in FIG. 2 and FIG. 5, the electrostatic discharge structure 400 may include an electrostatic collection sub-structure 401 and an electrostatic discharge sub-structure 402. The electrostatic collection sub-structure 401 may be used for collecting the static electricity concentrated onto the electrostatic concentration structure 300, and the electrostatic discharge sub-structure 402 is connected with the electrostatic collection sub-structure and used for discharging the static electricity collected by the electrostatic collection sub-structure 401.

In an embodiment, the electrostatic collection sub-structure 401 may be a convex portion protruded on the array substrate, and a surface of the convex portion has a conductive layer 4011. The conductive layer 4011 of the electrostatic collection sub-structure 401 is positionally corresponding to the electrostatic collection structure 300 and has an interval relative to the electrostatic collection structure 300 meets the present interval.

Exemplarily, the electrostatic collection sub-structure 401 is a convex structure protruded on the array substrate 100, and the conductive layer 4011 on the surface of the convex structure may be an ITO (indium-tin-oxide) layer. The electrostatic discharge sub-structure 402 may electrically connect to the electrostatic collection sub-structure 401 by the conductive layer 4011. The present interval is required to be smaller than the minimum interval between the surface conductive layers of the color film substrate 200 and the array substrate 100 when without disposing the electrostatic discharge structure 400 and the electrostatic concentration structure 300; for example, when the minimum interval between the surface conductive layers of the color film substrate 200 and the array substrate 100 is H and the present interval is M, then M<H. The convex structure may be formed by a material layer disposed under an insulating layer or between the insulating layer and a passivation layer of the array substrate 100, and the material layer may include one or more of a nitrogen-silicon compound material layer, an amorphous silicon material layer and a source material layer, but of course it is not limited thereto.

In an embodiment, the electrostatic discharge sub-structure 402 may be a thin film transistor disposed near the electrostatic collection sub-structure 401. A gate electrode 4021 and a drain electrode 4022 of the thin film transistor are connected, and the gate electrode 4021 is electrically connected to the conductive layer 4011 of the electrostatic collection sub-structure 401.

Exemplarily, the gate electrode 4021 of the thin film transistor is electrically connected with the conductive layer 4011 of the electrostatic collection sub-structure 401, the conductive layer 4011 may be an ITO layer, the gate electrode 4021 of the thin film transistor receives the static electricity collected by the electrostatic collection sub-structure 401 by connecting with the conductive layer 4011 of the electrostatic collection sub-structure 401. Meanwhile, the gate electrode 4021 and the drain electrode 4022 of the thin film transistor are electrically communicated with each other, when the gate electrode 4021 receives the static electricity collected by the electrostatic collection sub-structure 401, since the gate electrode 4021 and the drain electrode 4022 are electrically communicated with each other, a voltage on the drain electrode 4022 is higher than a voltage on a source electrode 4023, so that the thin film transistor is turned on and then the static electricity is discharged by the source electrode 4023 of the thin film transistor.

In an embodiment, the electrostatic discharge structure 400 may be grounded, or serially connected to form an electrostatic vortex discharge ring, or connected to a tip discharge structure, or connected to a preset signal circuit on the array substrate.

Exemplarily, when the electrostatic discharge structure 400 is a bidirectional protection diode circuit, one end of the bidirectional protection diode circuit is used for collecting static electricity concentrated onto the electrostatic concentration structure 300, another end of the bidirectional protection diode circuit may be grounded, or serially connected to form an electrostatic vortex discharge ring, or connected to a tip discharge structure, or connected to a preset signal circuit on the array substrate, and by the above connection manner, it discharges the collected static electricity. Alternatively, when the electrostatic discharge structure 400 includes the electrostatic collection sub-structure 401 and the electrostatic discharge sub-structure 402, the electrostatic collection sub-structure 401 is used for collecting the static electricity concentrated onto the electrostatic concentration structure 300. One end of the electrostatic discharge sub-structure 402 is electrically connected to the electrostatic collection sub-structure 401, the other end of the electrostatic discharge sub-structure 402 may be grounded, or serially connected to form an electrostatic vortex discharge ring, or connected to a tip discharge structure, or connected to a preset signal circuit on the array substrate, and by the above connection manner, it discharges the collected static electricity. When the electrostatic discharge sub-structure 402 is a thin film transistor, the gate electrode 4021 and the drain electrode 4022 of the thin film transistor are communicated with each other, the gate electrode 4021 is connected with the conductive layer 4011 of the electrostatic collection sub-structure 401. Wherein the electrostatic collection sub-structure 401 collects static electricity, the thin film transistor is turned on, the source electrode 4023 receives the collected static electricity. The source electrode 4023 may be grounded, or serially connected to form the electrostatic vortex discharge ring, or connected to the tip discharge structure, or connected to the preset signal circuit on the array substrate, and by the above connection manner, it discharges the collected static electricity. The preset signal circuit may be a CF-COM (color film common electrode) signal circuit, but of course it is not limited thereto.

An exemplary embodiment of the invention provides another electrostatic discharge device. The electrostatic discharge device may include: an electrostatic discharge structure 500, disposed on an array substrate 100 of a liquid crystal display panel. An interval between the electrostatic discharge structure 500 and a color film substrate 200 of the liquid crystal display panel meets a present interval.

The above electrostatic discharge device applied to the liquid crystal display panel can effectively reduce the damage caused by static electricity to the display panel by the electrostatic discharge structure, and further not only can carry out electrostatic protection on the side of color film substrate, but also can carry out electrostatic protection on the surroundings of the display panel, and therefore achieves strong anti-static protection ability.

In the following, various parts of the above described electrostatic discharge device in the exemplary embodiment will be described in more detail with reference to FIG. 6.

In a concrete embodiment, the color film substrate 200 may include a first electrode layer 201 and a black matrix layer 202. The array substrate 100 is disposed with the electrostatic discharge structure 500. The electrostatic discharge structure 500 may be formed by a material layer disposed under an insulating layer or between the insulating layer and a passivation layer, and the material layer may be multiple (i.e., more than one) of a red pixel material layer, a green pixel material layer, a blue pixel material layer, a photoresist layer and a metal material layer and of course is not limited thereto. The electrostatic discharge structure 500 is used for collecting static electricity on the first electrode layer 201 of the color film substrate 200, and thus an interval between the electrostatic discharge structure 500 and the first electrode layer 201 of the color film substrate meets the present interval. Within the present interval, the static discharge structure 500 can better collect the concentrated static electricity on the first electrode layer 201, but of course it is not limited thereto.

The liquid crystal display panel may include a display area 10 and a non-display area 20. The electrostatic discharge structure 500 may be disposed in the non-display area 20 of the liquid crystal display panel. The non-display area 20 may include multiple electrostatic discharge structures 500. The distribution position and quantity of the multiple electrostatic discharge structures 500 can be set as per electrostatic protection capabilities required by respective areas of the liquid crystal display panel. A convex shape of the electrostatic discharge structure 500 may be an elongated strip shape or a conical shape, but of course is not limited thereto.

Figure 10:
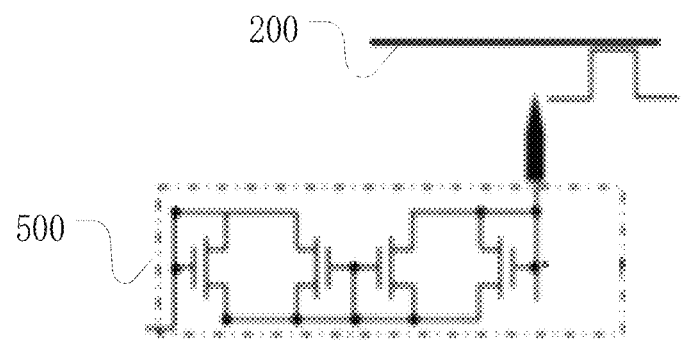
FIG. 10 is a schematic equivalent circuit diagram of the electrostatic discharge structure according to another exemplary embodiment of the invention.

In an embodiment, as shown in FIG. 10, the electrostatic discharge structure 500 may be a bidirectional protection diode circuit. An interval between the bidirectional protection diode circuit and the first electrode layer 201 of the color film substrate 200 is expected to meet a preset interval. An end of the bidirectional protection diode circuit is used for collecting static electricity on the first electrode layer 201, and another end of the bidirectional protection diode circuit is used for discharging the collected static electricity.

Figure 6:
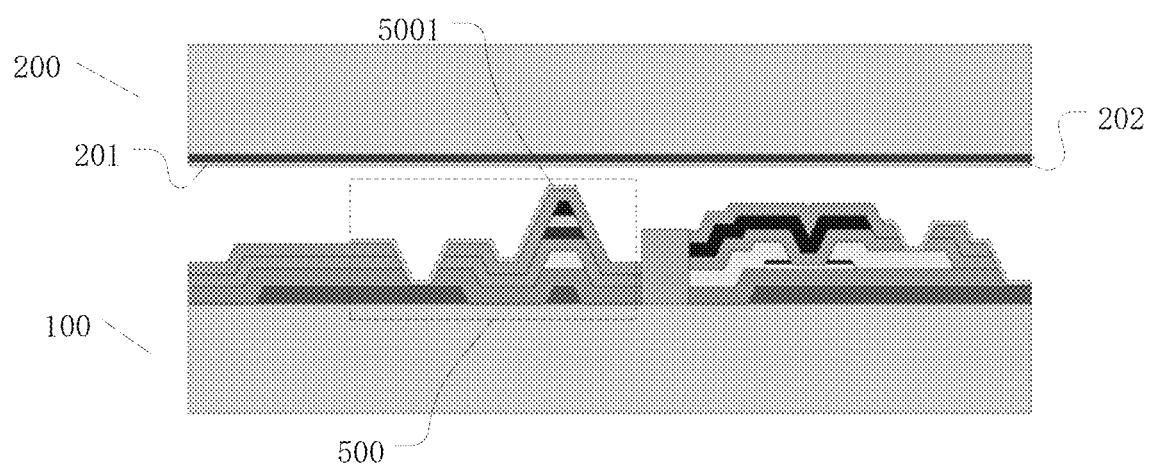
FIG. 6 is a schematic structural view of an electrostatic discharge device according to another exemplary embodiment of the invention.

In an embodiment, as shown in FIG. 6 and FIG. 6, the electrostatic discharge structure 500 may be protruded from the array substrate to form a convex portion, and a surface of the convex portion has a conductive layer 5001. The interval between the conductive layer 5001 and the color film substrate 200 of the liquid crystal display panel meets the preset interval. The electrostatic discharge structure 500 may be a convex structure formed by a material layer disposed under an insulating layer and/or between the insulating layer and a passivation protective layer of the array substrate 100, a surface of the convex structure has the conductive layer 5001, the conductive layer 5001 is used for collecting the static electricity on the first electrode layer 201 of the color film substrate 200 and discharging the collected static electricity, and the conductive layer 5001 may be an ITO layer. The material layer for forming the convex structure may include multiple of a red pixel material layer, green pixel material layer, a blue pixel material layer, a photoresist layer and a metal material layer, and of course is not limited thereto.

Figure 7:
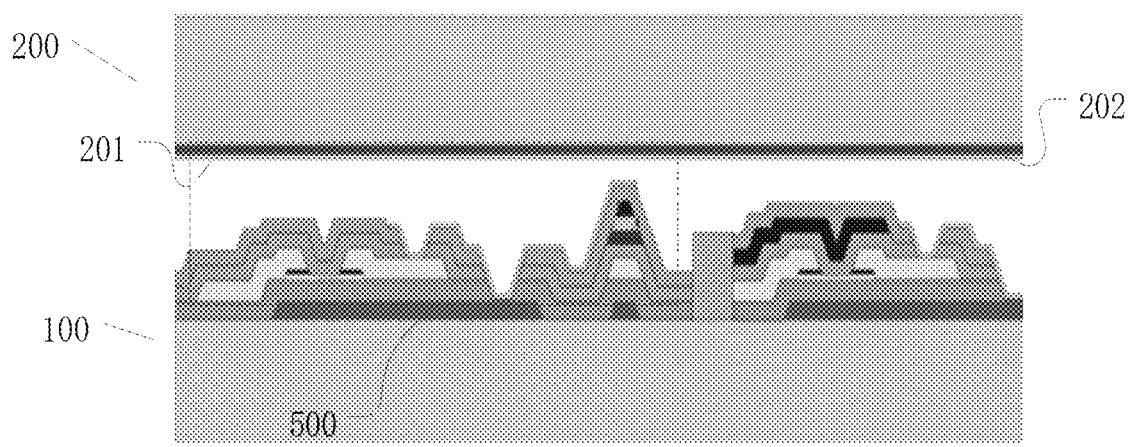
FIG. 7 is a schematic structural view of an electrostatic discharge device according to still another exemplary embodiment of the invention.
Figure 8:
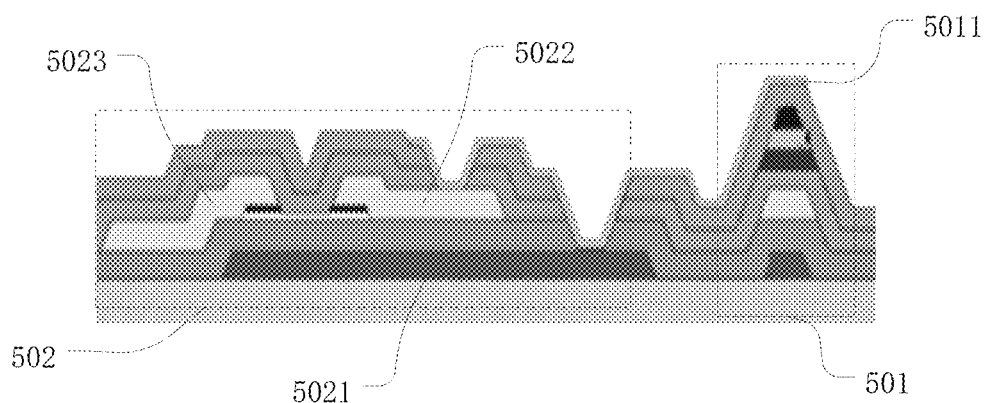
FIG. 8 is a schematic view of an electrostatic collection sub-structure and an electrostatic discharge sub-structure according to an exemplary embodiment of the invention.
Figure 9:
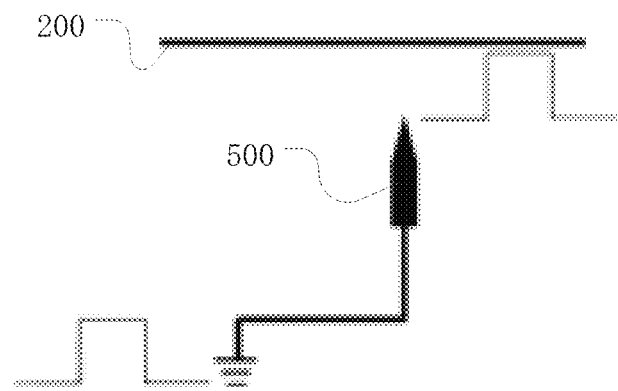
FIG. 9 is a schematic equivalent circuit diagram of the electrostatic discharge structure according to an exemplary embodiment of the invention.

In an embodiment, as shown in FIG. 7 and FIG. 8, the electrostatic discharge structure 500 may include an electrostatic collection sub-structure 501 and an electrostatic discharge sub-structure 502. The electrostatic collection sub-structure 501 may be used for collecting the static electricity on the first electrode layer 201, and the electrostatic discharge sub-structure 502 is connected with the electrostatic collection sub-structure 501 and used for discharging the static electricity collected by the electrostatic collection sub-structure 501.

In an embodiment, as shown in FIG. 8, the electrostatic collection sub-structure 501 may be protruded from the array substrate to form a convex portion, and a surface of the convex portion has a conductive layer 5011. An interval between the conductive layer 5011 of the electrostatic collection sub-structure 501 and the color film substrate 200 of the liquid crystal display panel meets a preset interval. In particular, the electrostatic collection sub-structure 501 may be a convex structure formed by a material layer disposed under an insulating layer and/or between the insulating layer and a passivation protective layer of the array substrate 100, a surface of the convex structure has a conductive layer 5011, an interval between the conductive layer 5011 and the first electrode layer 201 of the color film substrate 200 meets the preset interval, the conductive layer 5011 is used for static electricity on the first electrode layer 201 of the color film substrate 200 and may be an ITO layer. The material layer for forming the convex structure may include multiple of a red pixel material layer, a green pixel material layer, a blue pixel material layer, a photoresist layer and a metal material layer, and of course is not limited thereto.

Figure 11:
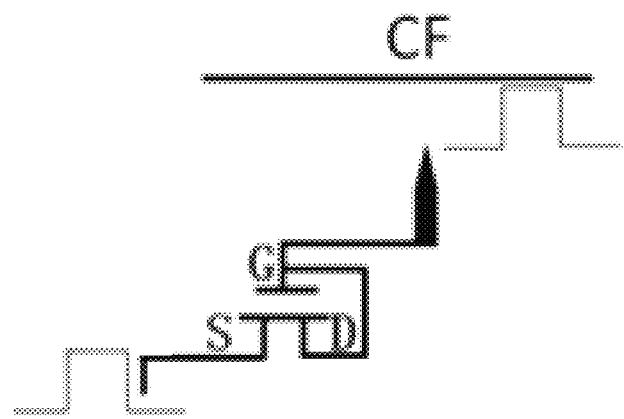
FIG. 11 is a schematic equivalent circuit diagram of the electrostatic discharge structure according to still another exemplary embodiment of the invention.

In an embodiment, as shown in FIG. 8 and FIG. 11, the electrostatic discharge sub-structure 502 may be a thin film transistor dispose near the electrostatic collection sub-structure 501. A gate electrode 5021 and a drain electrode 5022 of the thin film transistor are communicated with each other, and the gate electrode 5021 is electrically connected to the conductive layer 5011 of the electrostatic collection sub-structure 501.

Exemplarily, the gate electrode 5021 of the thin film transistor is electrically connected with the conductive layer 5011 of the electrostatic collection sub-structure 501, the conductive layer 5011 may be an ITO layer, and the gate electrode 5021 of the thin film transistor receives the static electricity collected by the electrostatic collection sub-structure 501 by connecting with the conductive layer 5011 of the electrostatic collection sub-structure 501. Meanwhile, the gate electrode 5021 and the drain electrode 5022 of the thin film transistor are communicated with each other, when the gate electrode 5021 receives the static electricity from the electrostatic collection sub-structure 501, since the gate electrode 5021 and the drain electrode 5022 are communicated with each other, a voltage on the drain electrode 5022 is higher than a voltage on the source electrode 5023, the thin film transistor is turned on and then discharges the static electricity through the source electrode 5023 of the thin film transistor.

In an embodiment, the electrostatic discharge structure 500 is grounded, or serially connected to form an electrostatic vortex discharge ring, or connected to a tip discharge structure, or connected to a preset signal circuit on the array substrate.

Exemplarily, when the electrostatic discharge structure 500 is a bidirectional protection diode circuit, or includes the electrostatic collection sub-structure 501 and the electrostatic discharge sub-structure 502, the electrostatic discharge structure 500 is grounded, or serially connected to form the electrostatic vortex discharge ring, or connected to the tip discharge structure, or connected to the preset signal circuit on the array substrate, a preset interval between the electrostatic discharge structure 500 and the first electrode layer 201 of the color film substrate 200 is required to be smaller than a minimum interval between surface conductive layers of the color film substrate 200 and the array substrate 100 when without disposing the electrostatic discharge structure 500. For instance, when the minimum interval between the surface conductive layers of the color film substrate 200 and the array substrate 100 is H, and the preset interval is M, then M<H; within the preset interval, the electrostatic discharge structure 500 can better collect the static electricity and discharge the collected static electricity.

When the electrostatic discharge structure 500 is protruded from the array substrate 100 to form a convex portion, and the electrostatic discharge structure 500 is grounded, or serially connected to form the electrostatic vortex discharge ring, or connected to the tip discharge structure, the preset interval between the electrostatic discharge structure 500 and the first electrode layer 201 of the color film substrate 200 is required to be smaller than the minimum interval between the surface conductive layers of the color film substrate 200 and the array substrate 100 when without disposing the electrostatic discharge structure 500. For example, when the minimum interval between the surface conductive layers of the color film substrate and the array substrate is H, and the preset interval is M, then M<H; within the preset interval, the electrostatic discharge structure 500 can better collect static electricity and discharge the collected static electricity. Alternatively, when the electrostatic discharge structure 500 is connected to the preset signal circuit on the array substrate 100, the preset interval between the electrostatic discharge structure 500 and the first electrode layer 201 of the color film substrate 200 is required to be smaller than the minimum interval between the surface conductive layers of the color film substrate 200 and the array substrate 100 when without disposing the electrostatic discharge structure 500 and greater than a height difference between a main spacer and a sub spacer in the liquid crystal display panel. For instance, when the minimum interval between the surface conductive layers of the color film substrate 200 and the array substrate 100 is H, the preset interval is M, and the height difference between the main spacer and the sub spacer in the liquid crystal display panel is S, then S<M<H; within the interval range, the electrostatic discharge structure 500 can better collect static electricity and discharge the collected static electricity. The preset signal circuit may be a CF-COM (color film common electrode) signal circuit, and of course is not limited thereto.

When the electrostatic discharge structure 500 is a bidirectional protection diode circuit, an end of the bidirectional protection diode circuit is used for collecting static electricity on the first electrode layer 201 of the color film substrate 200, and another end of the bidirectional protection diode circuit may be grounded, or serially connected to form the electrostatic vortex discharge ring, or connected to the tip discharge structure, or connected to the preset signal circuit on the array substrate 100, and by the above connection manner, the bidirectional protection diode circuit collects the static electricity on the first electrode layer 201 and discharges the collected static electricity. When the electrostatic discharge structure is protruded from the array substrate 100 to form a convex portion, the conductive layer 5001 on the surface of the electrostatic discharge structure 500 is used for collecting the static electricity on the first electrode layer, and the other end of the conductive layer 5001 is grounded, or serially connected to form the electrostatic vortex discharge ring, or connected to the tip discharge structure, or connected to the preset signal circuit on the array substrate 100 to discharge the collected static electricity. When the electrostatic discharge structure 500 includes the electrostatic collection sub-structure 501 and the electrostatic discharge sub-structure 502, the electrostatic collection sub-structure 501 is used for collecting the static electricity on the first electrode layer 201, an end of the electrostatic discharge sub-structure 502 is electrically connected with the conductive layer 5011 of the electrostatic collection sub-structure 501, another end of the electrostatic discharge sub-structure 502 may be grounded, or serially connected to form the electrostatic vortex discharge ring, or connected to the tip discharge structure, or connected to the preset signal circuit on the array substrate 100, and by the above connection manner, the electrostatic discharge sub-structure 502 discharges the collected static electricity. When the electrostatic discharge sub-structure 502 is a thin film transistor, the gate electrode and the drain electrode of the thin film transistor are communicated with each other, the gate electrode is connected to the conductive layer of the electrostatic collection sub-structure, the source electrode of the thin film transistor may be grounded, or serially connected to form the electrostatic vortex discharge ring, or connected to the tip discharge structure, or connected to the preset signal circuit on the array substrate 100, and by the above connection manner, the thin film transistor discharges the collected static electricity. The preset signal circuit may be the CF-COM signal circuit, and of course is not limited thereto.

Another exemplary embodiment of the invention provides a liquid crystal display panel, and the liquid crystal display panel may include the electrostatic discharge device as described in any one of the above embodiments.

Still another exemplary embodiment of the invention provides a display apparatus, and the display apparatus may include the liquid crystal display panel as described above.

The above-mentioned liquid crystal display panel and display apparatus can effectively reduce the damage caused by static electricity to the display panel by the electrostatic discharge structure, and further not only can carry out electrostatic protection on the side of color film substrate, but also can carry out electrostatic protection on the surroundings of the display panel, and therefore achieves strong anti-static protection ability.

It should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" and other directions or positional relationships are based on orientations or positional relationship shown in the drawings, which are only for the convenience of describing the embodiments of the invention and simplifying the description, rather than indicating or implying that the device or element referred to must have a specific orientation, be structured and operated in a specific orientation, and therefore cannot be construed as limitations to the embodiments of the invention.

Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the embodiments of the invention, "multiple" or "a plurality of" means two or more, unless otherwise specifically defined.

In the embodiments of the invention, unless otherwise clearly stated and limited, terms "installed", "connected", "coupled", "fixed" and so on should be understood broadly; for instance, can be a fixed connection, a detachable connection or an integral connection; can be a mechanical connection, can also be an electrical connection; can be a direct connection, can also be an indirect connection by an intermediary, can be an internal communication of two elements or an interaction between two elements. For those of ordinary skill in the art, concrete meanings of the above terms in the invention can be understood as per specific circumstances.

In the embodiments of the invention, unless otherwise clearly stated and limited, a first feature is "on" or "under" of a second feature may include direct contact between the first and second features, or the first and second features are not directly contacted but through other feature(s) between them. Moreover, a first feature is "above" a second feature include the first feature is directly above and obliquely above the second feature, or only indicates that a horizontal height of the first feature is higher than that of the second feature. A first feature is "under" a second feature include the first feature is directly under and obliquely under the second feature, or only indicates that a horizontal height of the first feature is smaller than that of the second feature.

In the description of the specification, descriptions of the reference terms "one embodiment," "some embodiments," "examples," "specific examples," or "some examples" and the like means that specific features, structures, materials, or features described in connection with the embodiments or examples are included in at least one embodiment or example of the invention. In this specification, illustrative descriptions of the above terms do not necessarily refer to the same embodiment or example. Moreover, the specific features, structures, materials or features described may be combined in an appropriate manner in any one or more embodiments or examples. In addition, those skilled in the art may combine different embodiments or examples described in this specification.

After considering the specification and practicing the invention disclosed herein, those skilled in the art will easily think of other embodiments of the invention. The instant application is intended to cover any variations, uses or adaptive changes of the invention. These variations, uses or adaptive changes follow the general principles of the invention and include common general knowledge or conventional technical means in the technical field not disclosed by the disclosure. The specification and embodiments are only regarded as illustrative, and a true scope and spirit of the invention are indicated by appended claims.

What is claimed is:

1. An electrostatic discharge device, being applied to a liquid crystal display panel and comprising:
    an electrostatic concentration structure, protruded on a color film substrate of the liquid crystal display panel; and
    an electrostatic discharge structure, disposed on an array substrate of the liquid crystal display panel and positionally corresponding to the electrostatic concentration structure, wherein an interval between the electrostatic discharge structure and the electrostatic concentration structure satisfies a preset interval;
    wherein the electrostatic discharge structure comprises an electrostatic collection sub-structure and an electrostatic discharge sub-structure electrically connected with the electrostatic collection sub-structure.

2. The electrostatic discharge device as claimed in claim 1, wherein the electrostatic collection sub-structure is protruded from the array substrate to form a convex portion, and a surface of the convex portion has a conductive layer;
    wherein the conductive layer of the electrostatic collection sub-structure is positionally corresponding to the electrostatic concentration structure, and an interval between the conductive layer and the electrostatic concentration structure satisfies the preset interval.

3. The electrostatic discharge device as claimed in claim 2, wherein the electrostatic discharge sub-structure is a thin film transistor disposed near the electrostatic collection sub-structure, a gate electrode and a drain electrode of the thin film transistor are communicated with each other, and the gate electrode is electrically connected to the conductive layer of the electrostatic collection sub-structure.

4. The electrostatic discharge device as claimed in claim 1, wherein the electrostatic discharge structure is grounded, or serially connected to form an electrostatic vortex discharge ring, or connected to a tip discharge structure, or connected to a preset signal circuit on the array substrate.

5. The electrostatic discharge device as claimed in claim 1, wherein the color film substrate comprises a first electrode layer and a black matrix layer, the electrostatic concentration structure is a material layer disposed between the first electrode layer and the black matrix layer and has an elongated strip shape or a conical shape.

6. An electrostatic discharge device, being applied to a liquid crystal display panel and comprising:
    an electrostatic concentration structure, protruded on a color film substrate of the liquid crystal display panel; and
    an electrostatic discharge structure, disposed on an array substrate of the liquid crystal display panel and positionally corresponding to the electrostatic concentration structure, wherein an interval between the electrostatic discharge structure and the electrostatic concentration structure satisfies a preset interval;
    wherein the electrostatic discharge structure is a bidirectional protection diode circuit.

7. A display apparatus comprising:
    a liquid crystal display panel, comprising a color film substrate and an array substrate disposed opposite to the color film substrate; and
    an electrostatic discharge device with an electrostatic discharge structure;
    wherein the electrostatic discharge device comprises:
        an electrostatic concentration structure, protruded on the color film substrate; and
        the electrostatic discharge structure, being disposed on the array substrate, positionally corresponding to the electrostatic concentration structure and having an interval with respect to the electrostatic concentration structure satisfying a preset interval;

or, wherein the electrostatic discharge device comprises:
the electrostatic discharge structure, being disposed on the array substrate and having an interval with respect to the color film substrate satisfying the preset interval;
wherein the electrostatic discharge structure is grounded, or serially connected to form an electrostatic vortex discharge ring, or connected to a tip discharge structure, or connected to a preset signal circuit on the array substrate.

8. The display apparatus as claimed in claim 7, wherein the electrostatic discharge structure is a bidirectional protection diode circuit.

9. The display apparatus as claimed in claim 7, wherein the electrostatic discharge structure comprises an electrostatic collection sub-structure and an electrostatic discharge sub-structure electrically connected with the electrostatic collection sub-structure.

10. The display apparatus as claimed in claim 9, wherein the electrostatic collection sub-structure is protruded from the array substrate to form a convex portion, and a surface of the convex portion has a conductive layer.

11. The display apparatus as claimed in claim 10, wherein the electrostatic discharge sub-structure is a thin film transistor disposed near the electrostatic collection sub-structure, a gate electrode and a drain electrode of the thin film transistor are communicated with each other, and the gate electrode is electrically connected to the conductive layer of the electrostatic collection sub-structure.

* * * * *